A. E. MAY.
HANDLE FOR COOKING UTENSILS.
APPLICATION FILED OCT. 7, 1914.
1,237,935.
Patented Aug. 21, 1917.
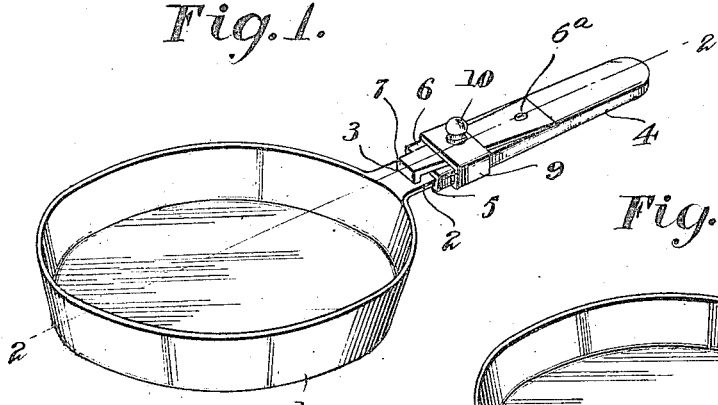
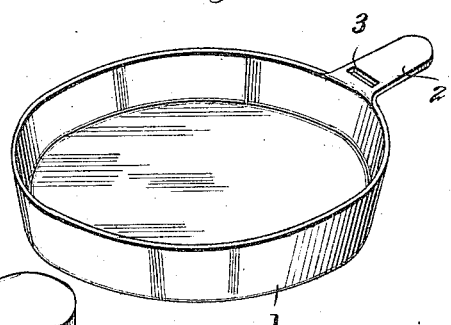
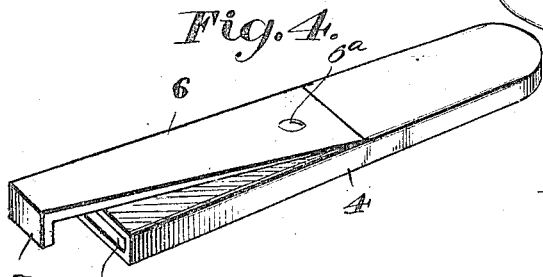
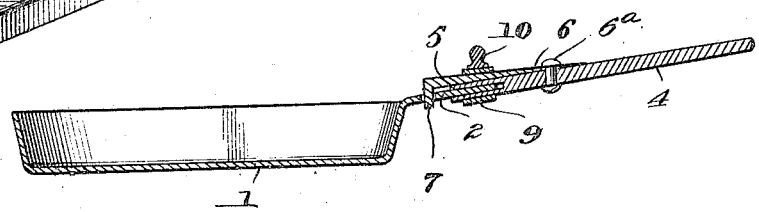
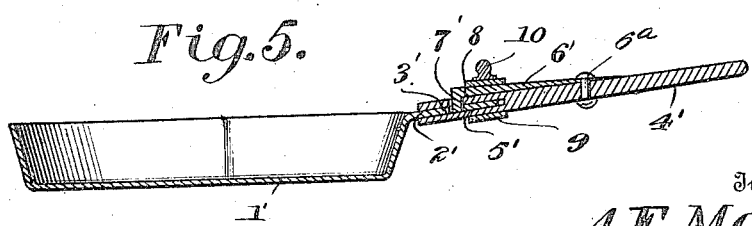
Inventor
A. E. May,
By Victor J. Evans
Attorney
Witnesses
Frederick W. Ely

UNITED STATES PATENT OFFICE.

ARTIE E. MAY, OF TERRA ALTA, WEST VIRGINIA.

HANDLE FOR COOKING UTENSILS.

1,237,935.  Specification of Letters Patent.  Patented Aug. 21, 1917.

Application filed October 7, 1914. Serial No. 865,541.

*To all whom it may concern:*

Be it known that I, ARTIE E. MAY, a citizen of the United States, residing at Terra Alta, in the county of Preston and State of West Virginia, have invented new and useful Improvements in Handles for Cooking Utensils, of which the following is a specification.

The present invention relates to improvements in cooking utensils.

In carrying out my invention it is my purpose to provide a cooking utensil with a stub handle and also to provide a removable handle having a catch for engaging with the stub handle, so that the removable handle may be at all times retained in a cool condition and further whereby a larger number of utensils may be placed upon the stove than is possible with the ordinary utensils provided with elongated handles.

It is also my purpose to provide a detachable handle which is substantially flat so that the natural tendency is to use it in a position where the hand will grasp it most readily, to make the stub handle of the utensil also flat, to form a socket in the end of the removable handle which will closely fit the stub handle so that the latter may not rotate or swing from side to side therein, and to provide fastening means on the removable handle for quickly and firmly engaging the stub handle when these parts are connected, no matter which side up the removable handle is applied. Thus an important object of my invention is carried out, which is that it gives the housewife practically no concern or trouble when she is called upon to attach the removal handle quickly to the stub handle of the utensil in which perhaps something is burning and there is need to remove the utensil at once from the stove.

With these and other objects in view, the improvement resides in the construction, combination and arrangement of parts set forth in the following specification and falling within the scope of the appended claims.

In the drawing:

Figure 1 is a perspective view of a utensil having a removable handle constructed in accordance with the present invention, Fig. 2 is a central longitudinal sectional view approximately on the line 2—2 of Fig. 1, Fig. 3 is a perspective view of the utensil with the handle removed, Fig. 4 is an enlarged perspective view of the handle, the catch actuating member being removed to permit of the spring catch moving to its inoperative position, and Fig. 5 is a longitudinal sectional view illustrating a slightly modified form of the device.

Referring now to the drawing in detail, the numeral 1 designates a cooking utensil, that illustrated in the drawings being in the nature of a pan or skillet, but it is of course to be understood that the improvement may be applied to any design of such utensils. The utensil 1 is provided with a laterally extending stub or short handle 2, the same being preferably oblong in cross section and being provided with a transversely arranged slot 3 which is preferably formed near the juncture of the stub with the utensil, the said stub projecting from the upper edge or lip of the utensil. The removable handle is indicated by the numeral 4 as a flattened member, the same being formed in one of its ends with a longitudinally extending socket 5 which is oblong to closely receive the stub 2 of the utensil 1. Secured upon what I will term the upper face of the handle 4 is a spring catch member 6, the same having its outer end standing normally slightly above the handle and provided with a downturned lip 7 which is adapted to be forced in the slot 3 in a manner which will presently be described. The spring catch 6 is secured to the handle by a headed element, such as a rivet $6^a$, as disclosed in the several figures of the drawing, and this element is arranged to contact with the slide member hereinafter to be referred to, to prevent the same being removed from the handle when moved in the direction of the said member $6^a$. The elongated body of the catch 6 gradually decreases in thickness from its inner end to its opposite end so that the last mentioned end is reduced to a feather edge and is secured to the handle 4 by a rivet $6^a$ beyond the bottom of the socket 5.

If desired and as illustrated in Fig. 5 of the drawings, the handle 4' may have what I will term its upper face provided with a transverse opening 8 which communicates with its socket 5', and the bent end or lip of the spring catch 6 is adapted to be inserted through the said opening and caused to enter the socket 5'. In this instance the slot 3' in the stub 2' of the utensil 1' is arranged in proper position to receive the lip 7' of the catch when the said catch is operated.

Arranged upon the handle is a sliding member or sleeve 9 which envelops both the handle and the spring catch, the said sleeve being provided with outwardly extending finger grips 10, so that the sleeve may be moved upon the handle toward the end of the same provided with the socket, and during such movement the inner upper wall of the sleeve will be moved along the inclined or beveled upper face of the catch 6 to swing the same toward the handle 4 and project its engaging lip 7 into the slot of the stub handle of the utensil. By moving the sleeve toward the outer end of the handle the lip of the spring catch will automatically spring beyond the socket so that the handle 4 may be pulled longitudinally off of the stub handle 2 of the utensil.

Thus it will be seen that I have produced a construction wherein the lip may stand beyond the inner extremity of the handle or may pass down through a hole 8 in its upper side, but in either case the movement of the sleeve causes the projection of this lip across the line of the socket and therefore across the line of the stub handle when the same is inserted in the socket. The opening 3 in the stub handle is by preference a transverse slot as shown, for the sake of giving a firmer engagement between it and a rather wide lip 7 as also shown, but this detail is not essential. I consider it highly important, however, that this opening shall pass entirely through the stub handle so that, in case the housewife should grasp the removable handle and present it to the utensil the other side up from the position in which it is shown in Fig. 1, the movement of the sleeve will project the lip upward through the slot 3 rather than downward, which is of course possible. This makes for the quick attachment of the removable handle to the stub handle, which would not follow if the latter and the socket were square or round. If square, there might be two points or positions of presentation of the removable handle where the tip of the lip would not engage either end of the slot, and if round there might be many such places, besides which the stub handle could then rotate within the cylindrical socket and the utensil might tip undesirably.

In some ways perhaps the form of my invention shown in Fig. 5 will be preferable. The tip of the lip here contacts with the lower inner wall of the socket when the sleeve 9 is run up to the position shown, and therefore—even if the parts should become worn—it is impossible to slip the sleeve off the end of the removable handle so long as the outer face of the spring catch 6' and the inner upper wall of the sleeve are correspondingly beveled. Again, when the tip of the lip stands always in the slot 8, rather than being free beyond the inner end of the handle as seen in Fig. 1, there is no possibility that the spring catch may become loose on its rivet 6ª and swing from side to side, and eventually become dislodged therefrom. Finally, the fact that the hook-shaped lip does not project beyond the end of the sleeve prevents it from being caught or entangled in the housewife's garments. Therefore, while I have spoken of this as a modified form of my device because structurally it might be a little more expensive to manufacture, it does possess points of utility which might render it preferable to the other form.

From the above description, taken in connection with the accompanying drawing, the simplicity of the device as well as the advantages thereof will, it is thought, be perfectly apparent to those skilled in the art to which such invention appertains without further detailed description.

Having thus described the invention, what I claim is:

1. The combination with a utensil having a flat stub handle provided with a transverse slot; of a removable handle also flat and having in its inner extremity a socket conforming with the cross section of the stub handle, a spring catch riveted near one end upon the detachable handle with its body normally separated therefrom and its other end having a right-angular lip standing transverse to the line of said socket and of a size to fit closely the slot in the stub handle, and a sleeve inclosing the removable handle and catch between the ends of the latter, for the purpose described.

2. The combination with a utensil, and stub handle projecting radially therefrom and of oblong cross-section, the handle being provided with a transverse slot; of a removable handle flat in contour and having in its inner end a socket of a cross section to closely fit the stub handle and in the upper wall of said recess a transverse slot adapted to register with that in the stub handle when the two handles are in correlated position, a spring catch having its body tapering toward its outer end and overlying the removable handle, its inner end being formed into a substantially right-angular lip standing within the slot in this handle and adapted to project through the slot in the stub handle, means for attaching its outer end to the removable handle, the body of the catch normally standing in raised position with respect to said handle, and a collar slidably inclosing this handle and the catch between the fastening means and the lip of the latter and having its inner upper wall beveled to correspond with the bevel of the body of the catch, for the purpose set forth.

In testimony whereof I affix my signature in presence of two witnesses.

ARTIE E. MAY.

Witnesses:
　JESSE HOMER MAY,
　SIMON METHEMEY.